US012777507B2

(12) United States Patent
Palamadai et al.

(10) Patent No.: US 12,777,507 B2
(45) Date of Patent: Oct. 27, 2026

(54) VEHICULAR CELLULAR NETWORK ACCESS TECHNOLOGY CONTINUITY

(71) Applicants: AT&T Intellectual Property I, L.P., Atlanta, GA (US); AT&T Mobility II LLC, Atlanta, GA (US)

(72) Inventors: Rashmi Palamadai, Naperville, IL (US); Peter Wong, Redmond, WA (US); Robert Holden, Allen, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 332 days.

(21) Appl. No.: 18/536,141

(22) Filed: Dec. 11, 2023

(65) Prior Publication Data

US 2025/0193910 A1 Jun. 12, 2025

(51) Int. Cl.

*H04W 72/51* (2023.01)
*H04W 16/18* (2009.01)
*H04W 28/02* (2009.01)
*H04W 64/00* (2009.01)

(52) U.S. Cl.

CPC ........... *H04W 72/51* (2023.01); *H04W 16/18* (2013.01); *H04W 28/0215* (2013.01); *H04W 64/003* (2013.01)

(58) Field of Classification Search

CPC ... H04W 16/18; H04W 24/08; H04W 64/003; H04W 76/50; H04W 4/90; H04W 72/51; H04W 28/0215
USPC ................................................ 370/339, 329
See application file for complete search history.

(56) References Cited

U.S. PATENT DOCUMENTS

| | | | | |
|---|---|---|---|---|
| 2014/0185604 | A1* | 7/2014 | Kil | H04W 48/16 370/338 |
| 2016/0007169 | A1* | 1/2016 | Margis | H04W 12/088 370/329 |
| 2016/0173186 | A1* | 6/2016 | Li | H04W 72/0453 370/315 |
| 2021/0159946 | A1* | 5/2021 | Raghavan | H04B 7/063 |
| 2023/0121913 | A1* | 4/2023 | Gurumurthy | H04W 4/40 701/24 |
| 2023/0401902 | A1* | 12/2023 | Zeira | G06Q 10/06315 |
| 2024/0314576 | A1* | 9/2024 | Ramachandran | H04W 64/003 |
| 2025/0080182 | A1* | 3/2025 | Raghavan | H04B 7/0695 |
| 2025/0106617 | A1* | 3/2025 | Singh | H04W 8/183 |

OTHER PUBLICATIONS

Zhou, “Future Communication Model for High-speed Railway Based on Unmanned Aerial Vehicles”, arXiv.org (Year: 2014).*

* cited by examiner

*Primary Examiner* — Omer S Mian
(74) *Attorney, Agent, or Firm* — Guntin & Gust, PLC; Andrew Gust

(57) ABSTRACT

A processing system including at least one processor of a network access device may detect an installation of the network access device in a wireless communication system of a vehicle. The processing system may next interrogate at least one antenna unit of the wireless communication system of the vehicle and obtain, from the at least one antenna unit in response to the interrogating, a set of antenna capability information. The processing system may then configure the wireless communication system of the vehicle in accordance with at least a portion of the set of the antenna capability information.

20 Claims, 3 Drawing Sheets

200

VEHICULAR CELLULAR NETWORK ACCESS TECHNOLOGY CONTINUITY

The present disclosure relates generally to network-connected vehicle operations, and more particularly to methods, computer-readable media, and apparatuses for a processing system of a network access device configuring a wireless communication system of a vehicle in accordance with antenna capability information obtained from an antenna unit of the wireless communication system.

BACKGROUND

Current trends in wireless technology are leading towards a future where virtually any object can be network-enabled and addressable on-network. 3$^{rd}$ Generation Partnership Project (3GPP) 4G/Long Term Evolution (LTE) and 5G are currently available technologies supporting increased adoption of network connectivity for various types of devices and applications in numerous fields. For example, autonomous vehicles are increasingly being utilized for a variety of commercial and other useful tasks, such as package deliveries, search and rescue, mapping, surveying, and so forth, enabled at least in part by these wireless communication technologies.

SUMMARY

In one example, the present disclosure describes a method, computer-readable medium, and apparatus for a processing system of a network access device configuring a wireless communication system of a vehicle in accordance with antenna capability information obtained from an antenna unit of the wireless communication system. For example, a processing system including at least one processor of a network access device may detect an installation of the network access device in a wireless communication system of a vehicle. The processing system may next interrogate at least one antenna unit of the wireless communication system of the vehicle and obtain, from the at least one antenna unit in response to the interrogating, a set of antenna capability information. The processing system may then configure the wireless communication system of the vehicle in accordance with at least a portion of the set of the antenna capability information.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
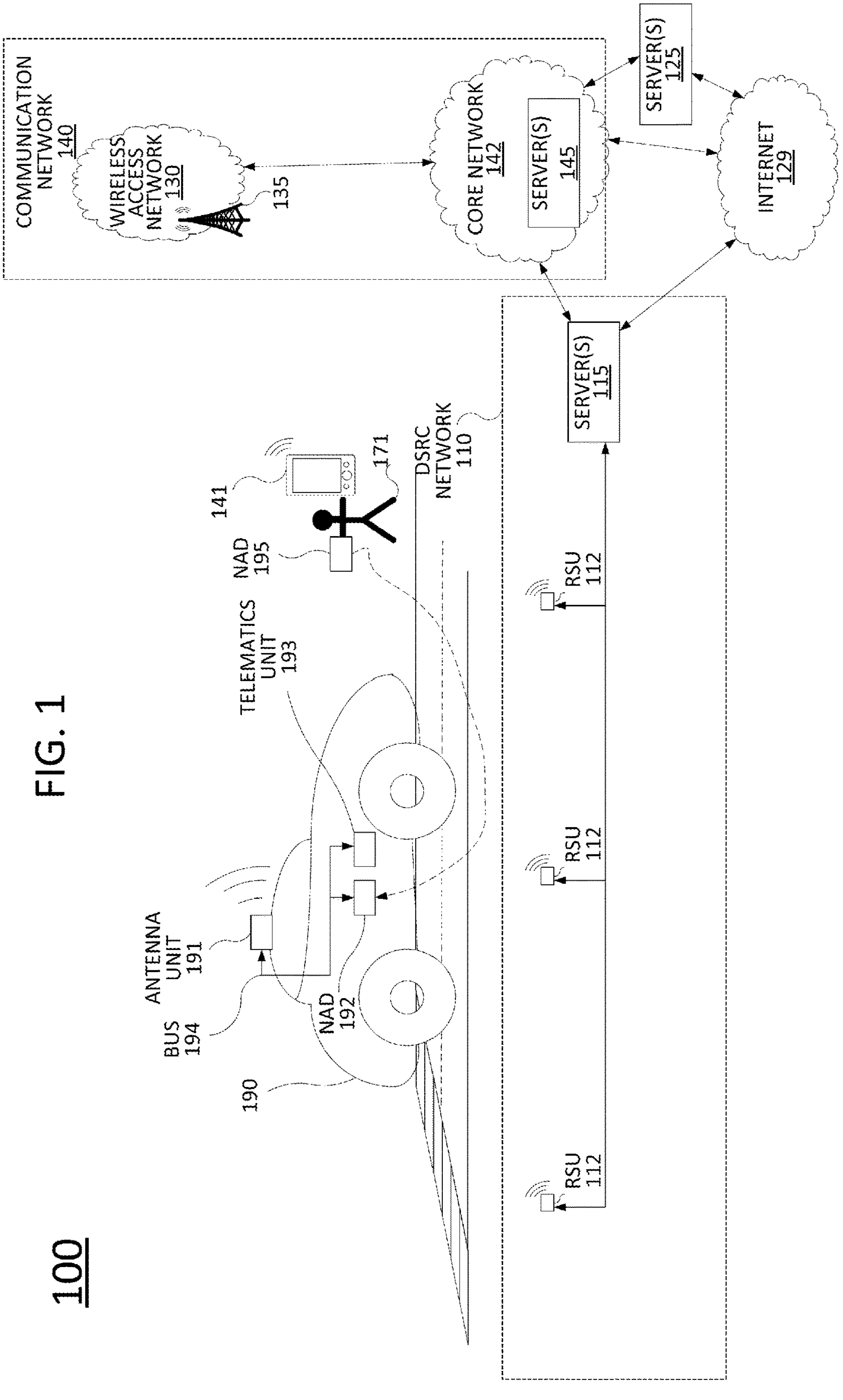
FIG. 1 illustrates an exemplary network related to the present disclosure.

Examples of the present disclosure describe methods, computer-readable media, and apparatuses for a processing system of a network access device configuring a wireless communication system of a vehicle in accordance with antenna capability information obtained from an antenna unit of the wireless communication system. In particular, examples of the present disclosure provide for long-term connectivity of network-connected vehicles, and hence for vehicle longevity. For instance, 3$^{rd}$ Generation Partnership Project (3GPP) 4G/Long Term Evolution (LTE) and 5G are presently available technologies, while a 6G release is already being planned for the future. At the same time, users and consumers of connected vehicles and Internet of Things (IoT) devices expect these products to maintain long-term operations. However, given that vehicle usage often exceeds 15-20 years, many vehicles could outlast currently available cellular network connection technology. As described herein, examples of the present disclosure provide for long-term support and connectivity. For instance, examples of the present disclosure carry forward older wireless technology as the evolution of cellular network access technology may occur more frequently than vehicle replacement timelines.

In one example, the present disclosure provides for a flexible design in which the antenna and radio system may be separated (e.g., not a single package or unit). This enables unique combinations of antenna systems and radio units (e.g., network access devices (NADs)), which may be mixed and matched. Thus, both original equipment manufacturer (OEM)-driven designs and user-customizable selection of modules may be equally accommodated. As described in greater detail below, in one example, a full replacement and/or upgrade of a radio system (e.g., NAD) is also supported. For instance, examples of the present disclosure provide a modular design where an antenna/antenna unit and a radio unit (e.g., a NAD) are separate devices, but which function together as a combined antenna-radio system (e.g., a cellular communication system).

In one example, robust antenna interrogation allows a NAD to identify specifically what cellular communication features an antenna system supports, and how the antenna system can be tuned. For instance, in response to an interrogation the antenna system may provide feedback and specific updates on supported range and capabilities, number of tunable elements, array type, frequency range, bandwidth, and so forth. Based on the NAD configuration, and in one example, further based upon mobile network operator guidance/instructions, the NAD may then instruct the antenna as to which band(s) should be operational, and values for other configurable parameters. In one example, a NAD may establish an initial setting, and after establishing minimal connectivity to a cellular network, the NAD may then obtain any additional carrier requirements, preferences, etc. and may then update the antenna system settings accordingly. In one example, the antenna system may send back confirmation on what has been configured, including any failure messages/updates.

In one example, additional failure mechanisms may be included to avoid disruption of service. For instance, examples of the present disclosure may include automated subscriber identity module (SIM) transfer from an old NAD to a new NAD and/or account provisioning for a new SIM associated with a new NAD for seamless transition of service. In one example, any failure or other issues in connection with such a process may be remedied via an artificial intelligence (AI) and/or machine learning (ML)-driven failure/correction loop. For instance, any attempted transfer or activation of new SIM/deactivation of old SIM may be rolled-back for any detected issues.

In addition, a cellular network may learn configurations, device types, NAD/antenna system combinations, and so forth that may be associated with increased instances of SIM/account provisioning errors and/or apparent configuration errors (e.g., resulting in lack of cellular network connectivity and/or poor network connectivity, etc.). In one example, the cellular network may provide information to the NAD of combinations and/or configurations that may be associated with failure or poor performance. Thus, for example, a user may be informed so as to select a different combination, the NAD may select different initial settings for the antenna system and/or for one or more configurable settings of the NAD itself (e.g., a number of antenna ports, a port to antenna element mapping, or the like), and so forth. As such, examples of the present disclosure provide a carrier management approach to NAD upgrade, leveraging learning from past upgrades and observation of performance of different vehicle cellular communication system combinations (e.g., NAD(s) plus antenna system(s)).

Thus, examples of the present disclosure provide the ability to carry forward with older wireless technologies, such that cellular communication evolution may occur more frequently than vehicle lifespans, while also supporting a flexible, modular design approach for progressive updating/upgrading and/or customization of NADs with re-use of antenna systems and available hardware (e.g., vehicle communication busses, etc.). Accordingly, examples of the present discourse may also prevent or reduce the need to replace antenna systems or other cellular communication hardware. In addition, a NAD may find and/or select optimal settings in accordance with its own capabilities and that of the antenna system(s) available to the vehicle, in one example with network operator communication/assistance upon installation and on an ongoing basis to avoid service disruptions.

Although the present disclosure is discussed below in the context of example cellular access networks and dedicated short range communication (DSRC) networks, the present disclosure is not so limited. Namely, the present disclosure can be applied to various types of communication networks using various types of communication protocols, e.g., a combination of any one or more of: wired and wireless local area network (LANs), wide area networks (WANs), various types of cellular networks, e.g., general packet radio service (GPRS) networks, uniform terrestrial radio access networks (UTRANs), Global System for Mobile Communications (GSM) networks, Long Term Evolution (LTE) networks, Fifth Generation (5G) networks, sixth generation (6G) networks, and the like, satellite networks, the Internet in general and so forth. Thus, these and other aspects of the present disclosure as discussed in greater detail below in connection with the examples of FIGS. 1-3.

To aid in understanding the present disclosure, FIG. 1 illustrates an example system 100 (e.g., one or more networks) in which examples of the present disclosure may operate. In an illustrative example, the system 100 comprises a communication network 140 (e.g., a telecommunication network) which may comprise a core network 142 (e.g., a cellular core network, a backbone network, etc.) and a wireless access network 130 (e.g., a cellular access network), a dedicated short range communication (DSRC) network 110, and the Internet 129. In one example, wireless access network 130 may comprise a Universal Terrestrial Radio Access Network (UTRAN), or an evolved Universal Terrestrial Radio Access Network (eUTRAN) and the base station 135 may comprise a NodeB or an evolved NodeB (eNodeB), or may comprise a 5G radio access network, e.g., where base station 135 may comprise a gNodeB (or gNB). In one example, the core network 142 may comprise an Evolved Packet Core (EPC) network, or the like. In another example, core network 142 may comprise an IP network, a multi-protocol label switching (MPLS) network, etc. In still another example, the wireless access network 130 may comprise a basic service set and the base station 135 may comprise a base transceiver station (BTS). In other words, wireless access network 130 may comprise a second generation (2G) network, a third generation (3G) network, a fourth generation (4G) network and/or a Long Term Evolution (LTE) network, a 5G network, a 6G or other generation networks, and so forth.

In one example, the communication network 140 and the DSRC network 110 may be operated by different service providers, the same service provider, or a combination thereof. For example, DSRC network 110 may be operated by a governmental entity or a private entity managing a transportation region on behalf of a governmental entity. On the other hand, communication network 140 may be operated by a telecommunications network service provider. Various interconnections between DSRC network 110, wireless access network 130, core network 142, and other components are shown. In accordance with the present disclosure, it is contemplated that various communication devices may utilize any one or a combination of such networks and interfaces in order to communicate with one another.

In one example, the internal communications of the DSRC network 110 may use a 75 MHz frequency band around 5.925 GHz assigned by the Federal Communication Commission (FCC) of the United States for Intelligent Transportation Systems, or DSRC networks. In general, DSRC networks enable wireless vehicle-to-vehicle communications and vehicle-to-infrastructure communications. DSRC networks may exist for transmitting safety and road condition information to vehicles, to warn of traffic and weather, to sense nearby vehicles (e.g., blind spot detection), and so forth. In this regard, DSRC networks contemplate an on-board unit (OBU) for DSRC enabled vehicles to transmit, as well as to receive and display messages. It should be noted that in accordance with the present disclosure, an OBU may comprise one or more aspects of a vehicle wireless communication system as described herein, such as a network access device (NAD), a telematics unit, an antenna system, etc. However, in another example, an OBU for DSRC communication may comprise a separate system, or may comprise a separate module within a vehicle wireless communication system (e.g., in addition to a NAD, telematics unit, and/or antenna system, etc.). In one example, OBUs of different vehicles may also be equipped to communicate with other OBUs. For instance, in general, DSRC networks enable wireless vehicle-to-vehicle (V2V) communications and vehicle-to-infrastructure (V2I) communications.

As illustrated in FIG. 1, DSRC network 110 may interconnect and control a number of infrastructure elements, also referred to herein as roadway resources, which include roadside units (RSUs) 112. Other infrastructure elements that are not specifically illustrated in FIG. 1 may also comprise part of the DSRC network 110, e.g., traffic lights, informational signs (e.g., road-side display screens), restricted access gate(s), and so forth. DSRC network 110 also includes one or more servers 115 for managing infrastructure elements, for communicating with other elements and for controlling other aspects of the DSRC network 110.

Figure 3:
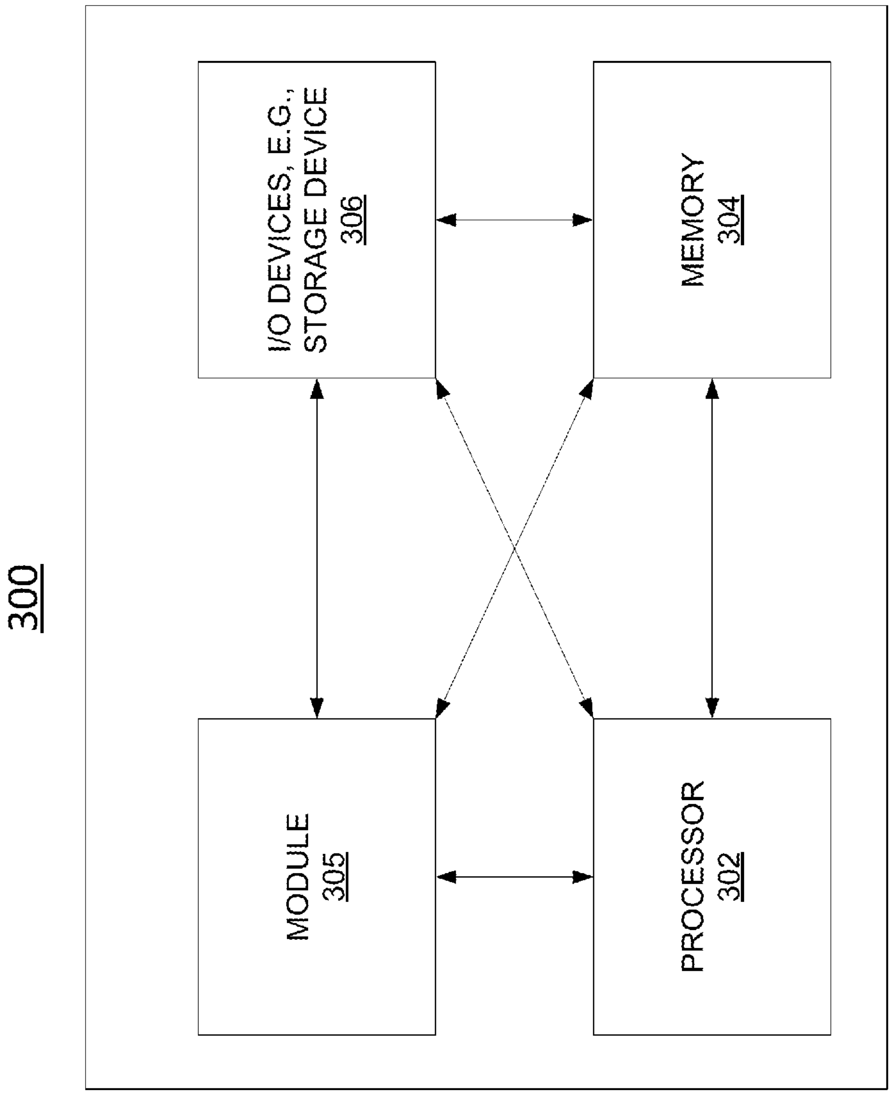
FIG. 3 illustrates an example high-level block diagram of a computing device specifically programmed to perform the steps, functions, blocks, and/or operations described herein.

In one example, the server(s) 115 may comprise a computing system, or systems, such as one or more instances of computing system 300 depicted in FIG. 3, and may be configured to provide one or more functions in connection with examples of the present disclosure for a processing system of a network access device configuring a wireless communication system of a vehicle in accordance with antenna capability information obtained from an antenna unit of the wireless communication system. In one example, DSRC network 110 may provide connectivity between vehicle wireless communication systems (e.g., OBUs or the like) and communication network 140, e.g., for obtaining configuration information that may be used in connection with setting up a new NAD, or the like. It should be noted that any one or more of the functions described herein with respect to the DSRC network 110 may be performed by server(s) 115 and/or a plurality of servers deployed in a distributed environment (e.g., in a "cloud-based" environment). For instance, DSRC network 110/server(s) 115 may control the timing of traffic lights, may coordinate the timing of two or more of traffic lights in a synchronized manner, and so forth. It should also be noted that DSRC network 110 may operate in accordance with alternative or additional technologies. For instance, RSU(s) 112 may alternatively or additional comprise access points (APs) that may establish a wireless local area network (WLAN), e.g., an Institute for Electrical and Electronics Engineers (IEEE) 802.11 network (e.g., a Wi-Fi network), an IEEE 802.15, e.g., a Bluetooth network, a ZigBee network, and so forth, a mesh network comprising a combination of interconnected devices using a plurality of such communication modalities and protocols, or the like.

As further illustrated in FIG. 1, an example vehicle 190 may be equipped with an associated vehicle wireless communication system that may be used to communicate with other network connected devices/systems via one or more networks, e.g., via wireless access network 130, DSRC network 110, communication network 140, Internet 129, etc. For instance, in one example, the wireless communication system may include an antenna unit 191 and a network access device (NAD) 192. In one example, the wireless communication system may additionally include bus 194 and/or telematics unit 193. The antenna unit 191 may include an antenna array comprising one or more antenna elements, which may be arranged in a pattern such as a linear array, a grid, or the like. The antenna elements may be of one or more types, such as dipole antenna elements, cross-dipole antenna elements, patch antenna elements, and so forth. The antenna unit 191 may also include one or more backplanes/reflectors, an antenna radome/housing, feed lines and/or a feed network, and so forth. The telematics unit 193 may comprise or may be in communication with various vehicular systems, such as a light detection and ranging (LiDAR) unit, one or more cameras, an accelerometer, a gyroscope, a compass, a fuel sensor, a radar unit, one or more temperature sensors, pressure sensors, or the like.

In one example, NAD 192 may comprise a cellular radio unit. In one example, NAD 192 may further comprise a radio unit for non-cellular wireless communication, such as IEEE 802.11, IEEE 802.15 (e.g., Bluetooth, or the like), DSRC, etc. In one example, NAD 192 may include one or more subscriber identity modules (SIMs), such as a removable or non-removable SIM card and/or an electronic SIM (eSIM). In one example, NAD 192 may be configured to perform one or more steps, functions, or operations for a processing system of a network access device configuring a wireless communication system of a vehicle in accordance with antenna capability information obtained from an antenna unit of the wireless communication system, such as described below in connection with the example method 200 of FIG. 2. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, mobile device 141 may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, mobile device 141 may have both cellular and non-cellular access capabilities. Thus, mobile device 141 may be in communication with server(s) 115, server(s) 145, etc. via a wireless connection to base station 135 and/or to RSU(s) 112. For instance, mobile device 141 may include one or more transceivers for cellular based communications, IEEE 802.11 based communications, IEEE 802.15 based communications, DSRC-based communications, and so forth. In one example, mobile device 114 may also be equipped to communicate directly with vehicle 190 (and/or other vehicles), e.g., via DSRC-based communications, via an LTE sidelink, a 5G sidelink, or the like, and so forth. Thus, in one example, vehicles (and in one example also including mobile devices, such as mobile device 141 and others) may communicate with each other directly (e.g., without necessarily involving RSUs 112, server(s) 115, etc.). In one example, mobile device 141 may be associated with user 171, who may also be a driver or passenger of vehicle 190 (broadly a "user").

In one example, vehicle 190 may alternatively or additional comprise a self-driving, autonomous vehicle (AV), or may comprise a self-driving-capable vehicle that is operating in a self-driving/autonomous mode, e.g., where an operator/driver may disengage such feature and manually operate the vehicle at any time. In this regard, the wireless communication system may include or may be in communication with a global positioning system (GPS) navigation unit of the vehicle 190 (e.g., via bus 194 or the like) that enables the driver, telematics unit 193, an autonomous or assisted operations module and/or remote server, etc. to input a destination, and which determines the current location, calculates one or more routes to the destination, and assists the driver, an autonomous or assisted driving system, or the like in navigating a selected route.

In an illustrative example, user 171 may desire to update/upgrade the vehicle 190 to use a new network access device (NAD) 193. For instance, the user may swap NAD 192 for NAD 195. In one example, vehicle 190 may be equipped such that the wireless communication system may have two installed NADs, e.g., coupled to bus 194. In such case, user 171 may install NAD 195 in an additional bay, slot, or the like. In one example, NAD 195 may include a new SIM for service activation with communication network 140 (and wireless access network 130). In accordance with the present disclosure, NAD 195 may be configured to self-assess the wireless communication system, e.g., by establishing communication with the antenna unit 191 via bus 194 and determining its characteristics and capabilities. Alternatively, or in addition, NAD 195 may initially establish communication with the old NAD 192 to obtain information of vehicle 190, such as the vehicle identification number (VIN), information regarding characteristics and/or capabilities of telematics unit 193 and/or antenna unit 191, configuration settings for NAD 192 and/or antenna unit 191, and so forth. In one example, NAD 195 may be auto-configured to initiate a process to activate a new SIM (e.g., an over-the-air (OTA) SIM provisioning). In one example, NAD 195 may associate itself with vehicle 190 and all or a portion of the information from the old NAD 192.

To further illustrate, NAD 195 may be installed in vehicle 190 and powered on. NAD 195 may be configured to identify other components within the vehicle wireless communication system, such as antenna unit 191 and telematics unit 193 connected to bus 194. In one example, NAD 195 may establish initial settings for use of antenna unit 191 to communicate with a cellular network (e.g., communication network 140) and/or to activate the SIM on the network, and may transmit instructions to antenna unit 191 to implement the settings/setting values. For example, NAD 195 may initially utilize current/existing settings of antenna unit 191 to establish basic communication with wireless access network 130 (e.g., via base station 135) and/or may select "safe" settings such as using an established cellular communication technology rather than a most recent available (e.g., using 5G or 4G/LTE versus 6G, etc.). Alternatively, or in addition, NAD 195 may configure one or more of its own settings in response to the information from antenna unit 191. To further illustrate, NAD 195 may select configuration settings for antenna unit 191 and/or for itself based upon feedback from antenna unit 191, such as supported communication range, specific capabilities/frequency bands/ranges, identifications of different antennas/antenna arrays (if there are multiple), a number of tunable antenna elements, a frequency range of each array and/or element; a bandwidth range of each array and/or element, and so forth.

In one example, the antenna unit 191 may comprise its own processing system, e.g., at least one processor, a memory, a storage module storing information about the antenna system and in one example also storing data, code, or the like for implementing one or more configurable settings, and so forth. As such, antenna unit 191 may receive and respond to NAD queries regarding capabilities and/or current settings of antenna unit 191, may receive instructions from NADs regarding settings/setting values to implement for one or more configurable settings, may implement such settings/setting values, and so forth. For instance, antenna unit 191 may indicate which cellular communication bands are supported (e.g., one or more frequency bands), which band(s) are currently in use and/or for which the antenna unit 191 is currently optimized (e.g., via current settings/setting values), and so forth.

In one example, in response to initial communication from NAD 195, e.g., via antenna unit 191 and base station 135/wireless access network 130, the communication network 140 may verify that the SIM of the NAD 195 is authorized for network services and/or may perform a SIM provisioning/activation. For instance, server(s) 145 may include a home subscriber server (HSS) and/or a unified data management (UDM) server, or the like, or may be in communication with such entities to initiate authorization and/or provisioning. In one example, the communication network 140 may next provide requirements, preferences, and/or recommendations to NAD 195. For example, server(s) 145 may further comprise a processing system/platform for vehicular NAD provisioning and support. In response, NAD 195 may make adjustments to the selected settings (which may also be conceptualized as selecting a new/different set of settings).

Thus, the NAD 195 may auto-tune the antenna unit 191 to a supported band and/or other configurations based on what NAD 195 has learned from interrogation of the antenna unit 191 and/or from carrier/network operator information. In one example, antenna unit 191 may send back confirmation on what has been configured. Alternatively, or in addition, antenna unit 191 may transmit messages/updates pertaining to any failures with respect to configurations as instructed and/or with respect to any network communication failures, such as an inability to detect a system information block (SIB) or the like. In one example, a successful network attachment (e.g., in one example including over-the-air (OTA) SIM provisioning) and activation of the new NAD 195 may be notified to the user 171. For instance, NAD 195 may include a display screen. Alternatively, or in addition, vehicle 190 may include a separate display screen and/or touch screen attached to bus 194 as part of the wireless communication system or as an independent component. Thus, for example, NAD 195 may cause the display screen to indicate a message of successful installation and NAD update.

In one example, NAD 195 may include an operating system and user interface for display via the display screen. In one example, NAD 195 may include an application specific to assisting in NAD upgrading/customization. In one example, the user interface may include control/service options for user 171, a service technician, etc. to initiate an installation of NAD 195, to confirm success, to troubleshoot, to obtain instructions on how to resolve known issues, etc. As noted above, in one example, NAD 195 may also configure itself based upon the feedback from antenna unit 191 and/or from the communication network 140, such as enabling/disabling antenna ports to match the configuration(s) of antenna unit 191, etc. In one example, the old NAD 192 may be shut down upon successful installation and activation of NAD 195. In one example, the communication network 140 may deactivate/deauthorize a SIM of NAD 192, where the new NAD 195 becomes primary and its SIM may be active. Thus, the new NAD 195 and/or the SIM thereof may be associated with vehicle 190 in an account record of communication network 140 for user 171. As noted above, if a failure occurs, the new SIM/NAD 195 may be rejected and the old SIM (e.g., of NAD 192) may remain active. User 171, a service technician, or the like may then troubleshoot and attempt to reinstall the new NAD 195.

In one example, the communication network 140 may provide a carrier-managed failure/correction loop, e.g., via server(s) 145 (e.g., a vehicular NAD provisioning and support platform). For instance, NAD 192 and/or NAD 195 may detect a failure to activate NAD 195 as the new/primary NAD and may notify the communication network 140. Alternatively, or in addition, the communication network 140 may detect a failure from the network-side. In one example, the communication network 140 may provide fallback support with existing/available bands (e.g., an earlier generation technology, such as via 4G/LTE band(s), where 5G, 6G, or later technologies may also be available) and confirm if the wireless communication system of vehicle 190 is still operational on such band(s). The communication network 140 and/or NAD (e.g., NAD 192 and/or NAD 195) may test one or more bands and may track success or failure of use. In one example, a user interface of NAD 192 and/or NAD 195 may provide notification to user 171 (or a service technician, etc.) of the limitations detected and/or the best available successful configuration.

In addition to initialization troubleshooting, the communication network 140 may also provide post-NAD upgrade optimizations. For example, the communication network 140 may learn and adapt to changes in available spectrum and the utilization thereof across various device types. For instance, server(s) 145 may collect performance data for different combinations of NADs and antenna system types, and the configurations/settings thereof for various network-connected vehicles. For example, NADs of different vehicles may report the settings to server(s) 145. In one example, NADs may also collect endpoint device-side performance metrics and report such information to server(s) 145. Server(s) 145 may therefore learn which combinations of NADs and antenna systems, and which settings provide for superior performance over one or more metrics, such as peak and average throughput, latency, reliability, and so forth. In one example, different settings may be identified as being optimal or providing improved or better performance for different data/communication types, e.g., real-time telematics versus passenger entertainment, media, etc. In one example, the communication network 140 (e.g., server(s) 145) may transmit recommendations to NAD 195 and others based upon ongoing learning, e.g., periodically or otherwise. Similarly, NAD 195 may be dynamically reconfigured to support new requests/requirements from user 171, from a vehicle manufacturer, from a regulatory entity (e.g., to comply with new governmental regulations or the like), and so forth. In one example, communication network-, user-, or equipment manufacturer-driven customization may permit vehicles, NADs, or other components to be "loaned" or "shared" among multiple users, e.g., for emergency purposes, etc.

In one example, server(s) 145 may learn recommended settings and may generate recommended settings in accordance with a selection function comprising an artificial intelligence (AI) and/or a machine learning (ML) algorithm (MLA), e.g., a decision tree, a binary classifier, etc. For instance, a selection function may have an input vector with features comprising an NAD type and/or NAD features and antenna system type (and/or antenna system features) and an output may be a recommended set of settings. In one example, the set of settings may be selected in accordance with an objective function to maximize one or more performance metrics (e.g., peak and/or average throughput, latency, reliability, and so forth) and/or a composite performance metric based upon sub-metrics of the same or a similar nature. For instance, a training data set may comprise labeled input vectors of an NAD type and/or NAD features and antenna system type (and/or antenna system features), configuration settings thereof, and a score (e.g., the label indicating the performance of such combination according to the objective function).

In one example, the objective function may be alternatively or additionally based upon user feedback regarding NAD and/or vehicle wireless communication system performance. For instance, users may be prompted periodically or otherwise to provide feedback scores, such as a rating from 1-5, etc. As such, this feedback may be used to adjust the factor weighting and adapt the recommendations based upon labeling/feedback. Thus, in one example, factors such as described above may comprise an input vector to the selection logic, in response to which the selection logic may generate an output (e.g., a recommended set of settings for an antenna system and/or for an NAD). In one example, a machine learning model (MLM), e.g., a trained MLA, may be trained to learn weights to apply to respective input factors of an objective function.

It should be noted that as referred to herein, a machine learning model (MLM) (or machine learning-based model) may comprise a machine learning algorithm (MLA) that has been "trained" or configured in accordance with input training data to perform a particular service. For instance, an MLM may comprise a deep learning neural network, or deep neural network (DNN), a convolutional neural network (CNN), a generative adversarial network (GAN), a decision tree algorithm/model, such as gradient boosted decision tree (GBDT) (e.g., XGBoost, XGBR, or the like), a support vector machine (SVM), e.g., a non-binary, or multi-class classifier, a linear or non-linear classifier, k-means clustering and/or k-nearest neighbor (KNN) predictive models, and so forth. It should be noted that various other types of MLAs and/or MLMs, may be implemented in examples of the present disclosure. In one example, server(s) 145 may also implement a reinforcement learning (RL) framework. For example, server(s) 145 may identify baseline recommended settings, and may then introduce variations to the baseline recommended settings for notification to different NADs. Server(s) 145 may then collect additional performance metrics relating to the vehicle wireless communication systems implementing such settings to determine whether the performance is superior to (or inferior to) an anticipated performance in accordance with the baseline recommended settings (e.g., in accordance with the objective function, and based upon one or more post-implementation performance metrics). Thus, for example, server(s) 145 may continuously adapt to different network utilization patterns by vehicle wireless communication systems and/or other endpoint devices in the network, different core and/or access network component availability, and so forth.

In addition to the above, in one example, NAD 195 may also obtain recommended or preferred settings, updates, and so forth from a manufacturer of NAD 195, a manufacturer of vehicle 190, a manufacturer of antenna system 191, a manufacturer of telematics unit 193, or the like. For instance, in the example of FIG. 1, NAD 195 may establish communications with server(s) 125, which may represent computing systems of one or more of these entities. For example, server(s) 125 may also obtain performance data regarding different combinations of NADs and antenna system types, and the configurations/settings thereof for various network-connected vehicles. Server(s) 125 may therefore learn which combinations of NADs and antenna systems, and which settings provide for superior performance over one or more metrics, such as peak and average throughput, latency, reliability, and so forth. In addition, server(s) 125 may communicate to NAD 195 and others with respect to different settings that may be identified as being optimal or providing improved or better performance with respect to different NAD-antenna system combinations (and in various examples, further with respect to different locations, different cellular networks/network operators, etc.), and so forth. In this regard, it should be noted that server(s) 125 may provide one or more steps, functions, and/or operations of a same or similar nature as that which is described above in connection with server(s) 145.

The foregoing illustrates just several scenarios of how the system 100 may support examples of the present disclosure for a processing system of a network access device configuring a wireless communication system of a vehicle in accordance with antenna capability information obtained from an antenna unit of the wireless communication system. Thus, it should be noted that various other operations may be included in various examples. For instance, in another example, DSRC network 110 may be used as an alternative or in addition to cellular communications via communication network 140, e.g., as an ongoing backup or as supplemental communication path for performance reporting, telematics communications, and so forth to server(s) 145, server(s) 125, or the like. For instance, in the event that NAD 195 fails to properly activate for cellular communications, an alternate communication pathway may be established to communication network 140 via DSRC network 110. In one example, communications via DSRC network 110 may be reserved for certain categories of communication. For instance, DSRC network 110 may be use for V2X communications, telematics, or the like, which may relate to vehicle operations and safety. However, passenger entertainment may be excluded from use of DSRC network 110. Thus, these and other features are all contemplated within the scope of the present disclosure.

The above system 100 is described to provide an illustrative environment in which examples of the present disclosure may be employed. In other words, the system 100 is merely illustrative of one network configuration that is suitable for implementing examples of the present disclosure. Thus, the present disclosure may also include any other different network configurations that are suitable for implementing embodiments of the present disclosure. For example, wireless access network 130 may comprise a wide area network (WAN), a series of LANs, and so forth. Similarly, as illustrated in FIG. 1, DSRC network 110 may interconnect infrastructure elements in the 5.9 GHZ DSRC band. However, the present disclosure is not limited to any specific protocol, such as DSRC, or any particular communication medium, e.g., the particular 5.9 GHz frequency band. For example, communications between OBUs (e.g., NADs and/or vehicle wireless communication systems) and RSUs may involve radio frequency identification (RFID) interrogation, or other forms of wireless communication. In addition, DSRC network 110 may include wired portions for connecting infrastructure elements to each other, to server(s) 115 and so forth. In one example, RSUs 112 may be integrated into other infrastructures, such as traffic lights, street lights, and so forth. In still another example, either or both of NADs 192 and 195 may not have a dedicated SIM, but may utilize a SIM of mobile device 141, e.g., via Bluetooth SAP, or the like. For instance, NAD 192 and/or NAD 195 may utilize a cellular communication subscription of a current user of the vehicle 190 (e.g., associated with user 171 and/or mobile device 141). Thus, networks including the above modifications and/or various additional modifications of the same or a similar nature are all included within the scope of the present disclosure.

Figure 2:
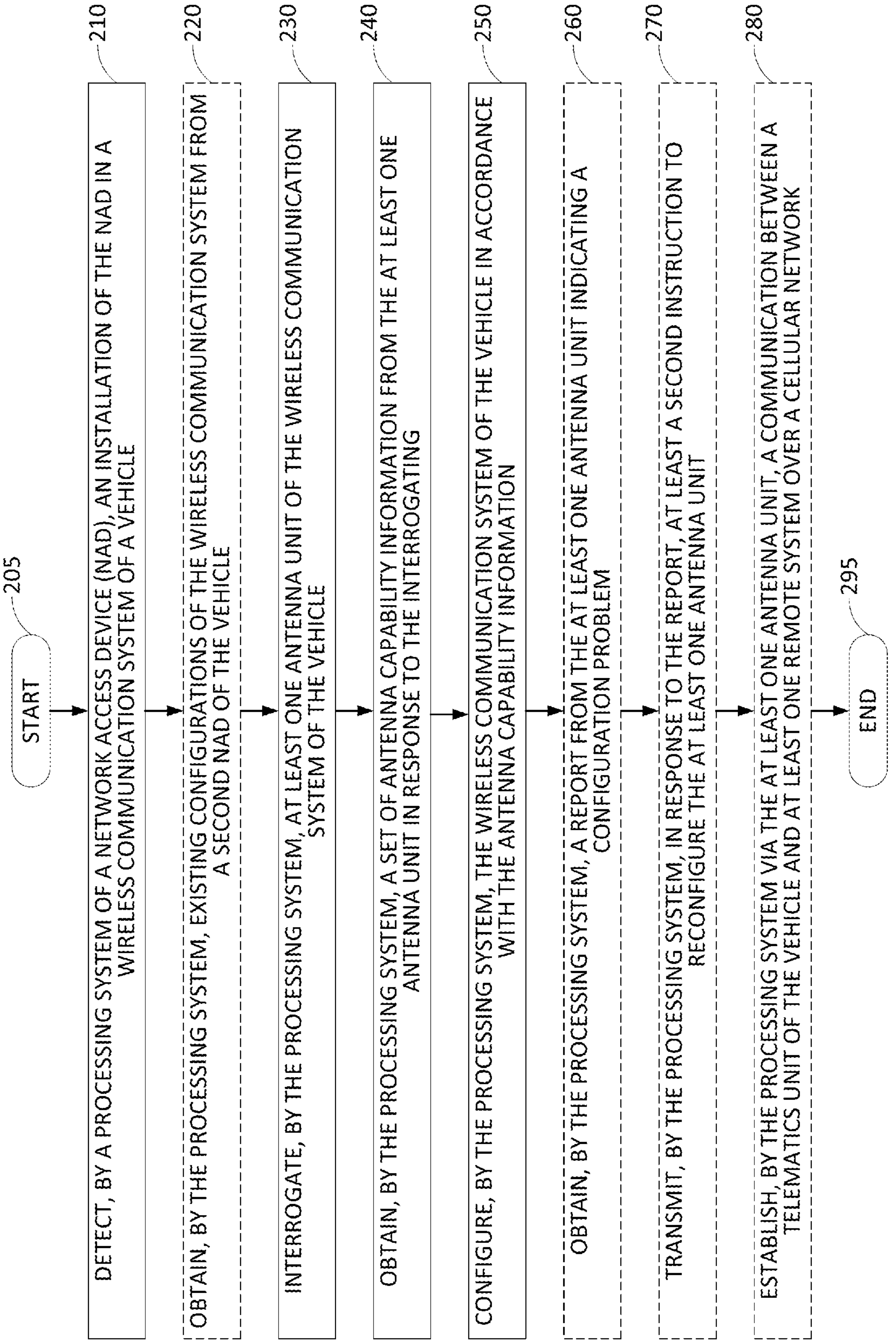
FIG. 2 illustrates a flowchart of an example method for a processing system of a network access device configuring a wireless communication system of a vehicle in accordance with antenna capability information obtained from an antenna unit of the wireless communication system.

FIG. 2 illustrates a flowchart of an example method 200 for a processing system of a network access device configuring a wireless communication system of a vehicle in accordance with antenna capability information obtained from an antenna unit of the wireless communication system. In one example, steps, functions and/or operations of the method 200 may be performed by a device or system as illustrated in FIG. 1, e.g., by a network access device (NAD), OBU, and/or vehicle wireless communication system, or any one or more components thereof. Alternatively, or in addition, the steps, functions and/or operations of the method 200 may be performed by a processing system collectively comprising a plurality of devices as illustrated in FIG. 1, such as an NAD, OBU, and/or vehicle wireless communication system and one or more of server(s) 145, server(s) 125, and so forth. In one example, the steps, functions, or operations of method 200 may be performed by a computing device or processing system, such as computing system 300 and/or hardware processor element 302 as described in connection with FIG. 3 below. For instance, the computing system 300 may represent any one or more components of the system 100 that is/are configured to perform the steps, functions and/or operations of the method 200. Similarly, in one example, the steps, functions, or operations of the method 200 may be performed by a processing system comprising one or more computing devices collectively configured to perform various steps, functions, and/or operations of the method 200. For instance, multiple instances of the computing system 300 may collectively function as a processing system. For illustrative purposes, the method 200 is described in greater detail below in connection with an example performed by a processing system. The method 200 begins in step 205 and may proceed to step 210.

At step 210, the processing system of a network access device (NAD) may detect an installation of the network access device in a wireless communication system of a vehicle. For example, the NAD may be installed in a bay, slot, or the like that is designated for the NAD. The slot may provide plug-and-play connectivity for the NAD. For instance, the slot may provide connection to a power source for the NAD. In addition, in one example, the slot may provide a connection to a communication bus (or multiple busses) of the vehicle, which may provide further connection to one or more other components, such as an antenna unit, a telematics unit, an entertainment unit, a global positioning system unit, and so forth. It should be noted that in another example, the NAD may be connected to the bus directly, e.g., without a "port" or "slot." In one example, the communication bus(es) may be dual- or multi-purpose, e.g., for delivering power to other components from one or more power sources, for conveying radio frequency or baseband signals from antenna unit(s) to an NAD, e.g., in addition to conveying control signals and messaging between components, and so forth.

At optional step 220, the processing system may obtain existing configurations of the wireless communication system from a second network access device of the vehicle. For instance, in one example, the vehicle may include two or more slots for connection of two or more NADs. In one example, one of the NADs may be designated as a primary NAD. For instance, the latest installed NAD may be made primary by default, but a different selection may be optionally made by a user from among the two or more NADs. Accordingly, in one example, the existing configurations may be obtained from the second NAD of the vehicle via a communication bus of the vehicle. In one example, optional step 220 may also include transfer of credentials from the old NAD to the new NAD. In one example, existing configurations may also include configurations for the NAD to interact with the telematics unit and/or for establishing communications for the telematics unit (e.g., to one or more remote servers or the like via a cellular network).

At step 230, the processing system interrogates at least one antenna unit of the wireless communication system of the vehicle. For instance, as noted above, the vehicle may include a communication bus, where the network access device/processing system may establish communication with the at least one antenna unit via the communication bus. In one example, the antenna unit may include its own processing system that may be configured to receive and respond to requests for capability and/or current configuration information, e.g., from NADs. Similarly, in accordance with the present disclosure, NADs may be configured to seek identification of antenna units, and their capabilities and configurations, upon initial installation and power-on within a vehicle wireless communication system.

At step 240, the processing system obtains a set of antenna capability information from the at least one antenna unit in response to the interrogating. For instance, the antenna capability information may identify supported wireless communication spectrum (e.g., frequencies, frequency ranges, frequency bands, or the like), antenna gain information of the at least one antenna unit (e.g., gain pattern(s)), antenna directivity information of the at least one antenna unit, antenna impedance information of the at least one antenna unit, or the like, and so forth. The antenna capability information may alternatively or additionally include antenna element type information of the at least one antenna unit (e.g., patch, dipole, etc.), antenna array layout information of the at least one antenna unit (e.g., linear array, square array, etc., a number of elements, or the like), and so forth.

At step 250, the processing system configures the wireless communication system of the vehicle in accordance with at least a portion of the antenna capability information. In one example, the configuring comprises selecting values for a plurality of settings of the wireless communication system (e.g., for the at least one antenna unit and/or for the NAD itself). For instance, in one example, step 250 may comprise transmitting at least one instruction to configure the at least one antenna unit. Alternatively, or in addition, step 250 may comprise adjusting at least one configurable parameter of the NAD, such as a number of antenna ports, a port-to-antenna array and/or antenna element mapping, a precoding, and so forth. In one example, the configuring of the wireless communication system of the vehicle may be further based upon at least a portion of the existing configurations that may be obtained at optional step 220. In one example, step 250 may further include activating a subscriber identity module (SIM) of the NAD. For instance, step 250 may include an OTA SIM provisioning process. It should be noted that in such an example, a SIM of the second NAD may be deactivated in response to an activation of the SIM of the NAD of the processing system. For instance, as noted above, in one example optional step 220 may include transfer of credentials from the old NAD to the new NAD. In this regard, it should be noted that in one example, the processing system (e.g., of the new NAD) may use mobile device SIM credentials of a user of the vehicle, e.g., via SAP. In this case, the old NAD may effectively be deactivated by a user authorizing the new NAD to use SIM credentials via SAP. However, in another example, a user may maintain an account with the cellular network by which the vehicle may have two NADs, which may have unique SIMs and/or which may be authorized to share SIM credentials, where the user can choose between them by selecting which NAD will use SIM credentials at any given time.

In one example, the configuring of step 250 may include obtaining recommended setting values from the cellular network, where the values for the plurality of settings are selected further based on the recommended setting values. For instance, as noted above, an initial communication with the cellular network may be established, recommended setting values may be obtained from the cellular network based upon an identification of the combination of NAD type and antenna unit type (and/or NAD capabilities and antenna unit capabilities, etc.), and the processing system/NAD may implement one or more values for the plurality of settings based upon the recommendations. It should be noted that the recommended setting values may include one or more required setting values, one or more optional but recommended setting values, and so forth. In one example, the cellular network may also provide one or more non-recommended/discouraged setting values or setting combinations. In one example, step 250 may include establishing communication(s) with an equipment manufacturer support platform, a vehicle manufacturer support platform, or the like (e.g., one or more servers) via the cellular network and/or via one or more other networks, and obtaining one or more recommended setting values from such server(s), e.g., in a same or similar manner as recommended setting values may be obtained from the cellular network. In one example, step 250 may include performing a reinforcement learning (RL) process over the plurality of settings, e.g., on an ongoing basis either self-directed and/or under the guidance of a component of the cellular network (such as server(s) 145 of FIG. 1 as described above).

At optional step 260, the processing system may obtain a report from the at least one antenna unit indicating a configuration problem. For instance, there may be a failure to implement one or more setting values, or a problem less than a failure, such as a diminished transmit or receive power, an inability to support higher modulation coding schemes, a mismatch between antenna ports and antenna elements, etc.

At optional step 270, the processing system may transmit, in response to the report, at least a second instruction to reconfigure the at least one antenna unit. For example, the processing system may attempt to reconfigure the at least one antenna unit to communicate using an earlier generation cellular communication technology, such as using 4G/LTE or 5G, where 6G is available but where 4G/LTE or 5G is still available and supported by the cellular network/radio access network.

At optional step 280, the processing system establishes, via the at least one antenna unit, a communication between a telematics unit of the vehicle and at least one remote system over a cellular network. For instance, the processing system may use existing configurations for communicating with the telematics unit that may be obtained at optional step 220. Alternatively, or in addition, the processing system may select one or more new settings based upon a default configuration of the processing system and/or the NAD, based upon one or more recommended settings from the cellular network, and so forth. In one example, optional step 280 may further include establishing one or more communications with remote entities via the cellular network for passenger entertainment, vehicle navigation information, and so forth.

Following step 250, or one of the optional steps 260-280, the method 200 proceeds to step 295. At step 295, the method 200 ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as aspects of step 250 to obtain recommended settings/setting values from the cellular network, an equipment manufacturer, and/or vehicle manufacturer on an ongoing basis, to implement the recommended settings, and so forth. In one example, the method 200 may be expanded to include collecting performance metrics. In one example, the method 200 may be expanded to include reporting performing metrics and/or setting values implemented by the processing system to the cellular network, an equipment manufacturer, and/or vehicle manufacturer. For example, one or more of such entities may collect data of this nature for AI/ML based learning of recommended setting values for different NAD-antenna unit combinations, and so forth.

In this regard, the present disclosure may further include a method performed by a network-based processing system comprising network-based operations that are complementary to the steps of the method 200, such as: obtaining a request from a new NAD to activate a SIM on the network, performing SIM provisioning via an HSS, UDM, or the like, obtaining information regarding the NAD and antenna unit(s) of a vehicle, applying an AI/ML model to the input information to obtain recommended setting values, providing the recommended setting values to the NAD, collecting performance metrics from the NAD(s) and/or user scores in connection with combinations of setting values for one or more NAD-antenna unit combinations, performing machine learning training/updating to train/update one or more MLMs for outputting recommended sets of setting values, providing information in response to a troubleshooting request, detecting poor performance and/or misconfiguration of a vehicle wireless communication system, adjusting network settings to support troubleshooting of the vehicle wireless communication system, e.g., to support a fallback to an older cellular communication technology to engage in diagnostic measurements, and so forth. In various other examples, the method 200 may further include or may be modified to include aspects of any of the above-described examples in connection with FIG. 1, or as otherwise described in the present disclosure. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for a processing system of a network access device configuring a wireless communication system of a vehicle in accordance with antenna capability information obtained from an antenna unit of the wireless communication system, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for a processing system of a network access device configuring a wireless communication system of a vehicle in accordance with antenna capability information obtained from an antenna unit of the wireless communication system (e.g., a software program comprising computer-executable instructions) can be loaded into memory 304 and executed by hardware processor element 302 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for a processing system of a network access device configuring a wireless communication system of a vehicle in accordance with antenna capability information obtained from an antenna unit of the wireless communication system (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:

detecting, by a processing system including at least one processor of a network access device, an installation of the network access device in a wireless communication system of a vehicle;

interrogating, by the processing system in response to detecting the installation, at least one antenna unit of the wireless communication system of the vehicle, wherein the vehicle includes a communication bus, wherein the processing system establishes a communication with the at least one antenna unit via the communication bus;

obtaining, by the processing system from the at least one antenna unit in response to the interrogating, a set of antenna capability information; and configuring, by the processing system, the wireless communication system of the vehicle in accordance with at least a portion of the set of the antenna capability information.

2. The method of claim 1, wherein the configuring comprises transmitting at least one instruction to configure the at least one antenna unit.

3. The method of claim 2, further comprising:

obtaining a report from the at least one antenna unit indicating a configuration problem; and transmitting, in response to the report, at least a second instruction to reconfigure the at least one antenna unit.

4. The method of claim 1, wherein the configuring comprises adjusting at least one configurable parameter of the network access device.

5. The method of claim 4, wherein the at least one configurable parameter comprises at least one of:

a number of antenna ports;

an antenna port to antenna element mapping; or a pre-coding.

6. The method of claim 1, wherein the network access device is in communication with the at least one antenna unit via the communication bus of the vehicle.

7. The method of claim 1, wherein the set of antenna capability information identifies supported wireless communication spectrum.

8. The method of claim 1, wherein the set of antenna capability information includes at least one of:

antenna gain information of the at least one antenna unit;

antenna directivity information of the at least one antenna unit; or antenna impedance information of the at least one antenna unit.

9. The method of claim 1, wherein the set of antenna capability information includes at least one of:

antenna element type information of the at least one antenna unit; or antenna array layout information of the at least one antenna unit.

10. The method of claim 1, further comprising:

obtaining existing configurations of the wireless communication system from a second network access device of the vehicle, wherein the configuring of the wireless communication system of the vehicle is further based upon at least a portion of the existing configurations.

11. The method of claim 10, wherein the existing configurations are obtained from the second network access device of the vehicle via the communication bus of the vehicle.

12. The method of claim 10, wherein a subscriber identity module of the second network access device is deactivated in response to an activation of a subscriber identity module of the network access device.

13. The method of claim 1, wherein the configuring comprises:

activating a subscriber identity module of the network access device.

14. The method of claim 1, further comprising:

establishing, by the processing system via the at least one antenna unit, a communication between a telematics unit of the vehicle and at least one remote system over a cellular network.

15. The method of claim 1, wherein the configuring comprises selecting values for a plurality of settings of the wireless communication system.

16. The method of claim 15, wherein the configuring comprises obtaining recommended setting values from a cellular network, wherein the values for the plurality of settings are selected further based on the recommended setting values.

17. The method of claim 15, wherein the configuring comprises performing a reinforcement learning process over the plurality of settings.

18. A non-transitory computer-readable medium storing instructions which, when executed by a processing system of a network access device including at least one processor, cause the processing system to perform operations, the operations comprising:

detecting an installation of the network access device in a wireless communication system of a vehicle;

interrogating, in response to detecting the installation, at least one antenna unit of the wireless communication system of the vehicle, wherein the vehicle includes a communication bus, wherein the processing system establishes a communication with the at least one antenna unit via the communication bus;

obtaining, from the at least one antenna unit in response to the interrogating, a set of antenna capability information; and configuring the wireless communication system of the vehicle in accordance with at least a portion of the set of the antenna capability information.

19. A network access device comprising:

a processing system including at least one processor; and a computer-readable medium storing instructions which, when executed by the processing system, cause the processing system to perform operations, the operations comprising:

detecting an installation of the network access device in a wireless communication system of a vehicle;

interrogating, in response to detecting the installation, at least one antenna unit of the wireless communication system of the vehicle, wherein the vehicle includes a communication bus, wherein the processing system establishes a communication with the at least one antenna unit via the communication bus;

obtaining, from the at least one antenna unit in response to the interrogating, a set of antenna capability information; and configuring the wireless communication system of the vehicle in accordance with at least a portion of the set of the antenna capability information.

20. The network access device of claim 19, wherein the configuring comprises transmitting at least one instruction to configure the at least one antenna unit.

* * * * *